A. O. CLAIN.
PAWL AND RATCHET MECHANISM FOR REELS.
APPLICATION FILED MAY 6, 1915.

1,190,631.

Patented July 11, 1916.

Witnesses:

Inventor
Albert O. Clain
By James A. Ramsey
Attorney.

UNITED STATES PATENT OFFICE.

ALBERT O. CLAIN, OF CINCINNATI, OHIO, ASSIGNOR TO FRED A. CASKEY, OF MARIETTA, OHIO.

PAWL-AND-RATCHET MECHANISM FOR REELS.

1,190,631.   Specification of Letters Patent.   Patented July 11, 1916.

Application filed May 6, 1915. Serial No. 26,326.

*To all whom it may concern:*

Be it known that I, ALBERT O. CLAIN, a citizen of the United States, and a resident of Cincinnati, in the county of Hamilton and State of Ohio, have invented certain new and useful Improvements in Pawl-and-Ratchet Mechanism for Reels, of which the following is a specification.

My invention relates to reels with ratchets, and more especially to reels for winding clothes lines, or for other use where the reel is to be quickly and conveniently removed from its mounting with the line thereon.

The object of my invention is to simplify the construction of such reels, and to provide an effective ratchet means, and means for conveniently and removably mounting the reel for operation and holding it in its mounting.

My invention consists in the combination of parts and in the details of construction and arrangement of parts as will herein be more fully described and claimed.

Figure 1:
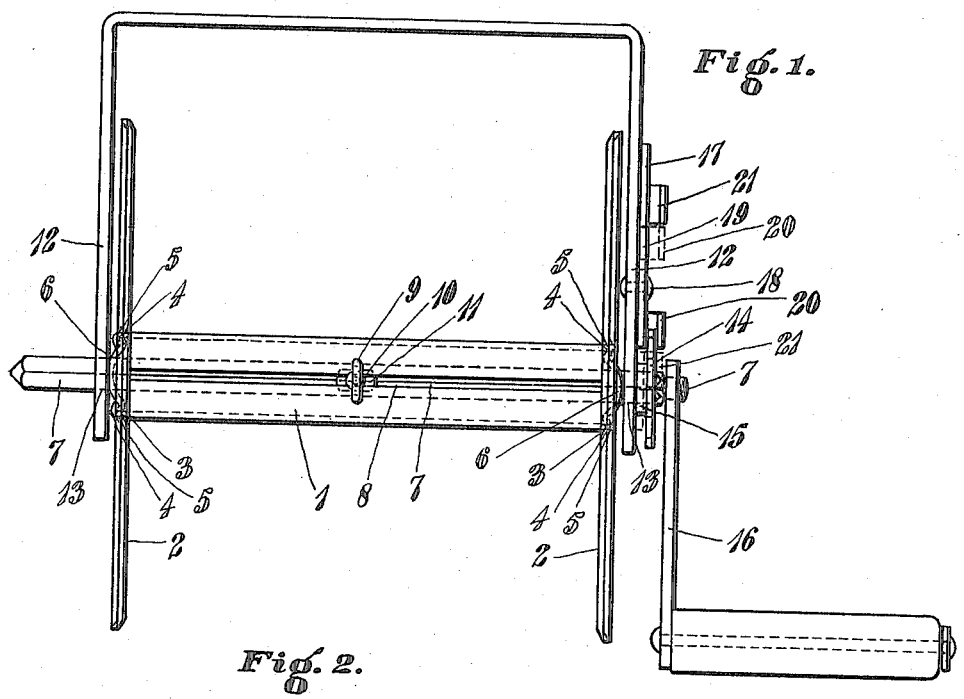
Figure 2:
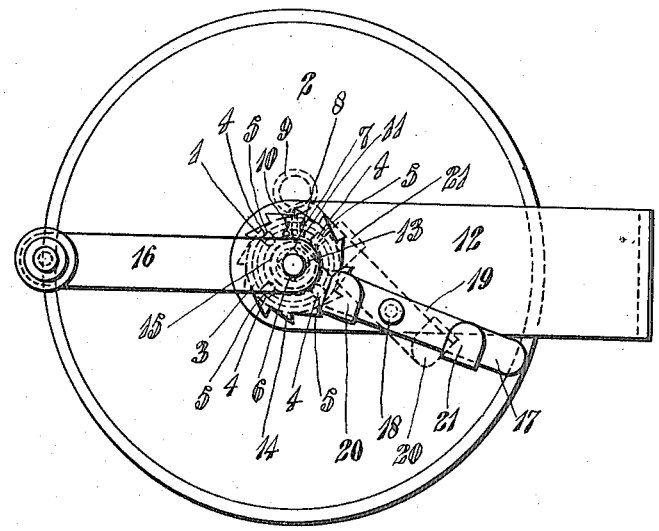

In the drawing: Figure 1 is a plan view of a reel embodying my invention; and Fig. 2 is a side elevation of the same.

The reel itself comprises a tubular core 1 having disks 2 fixed to its ends. The ends of said tube are admitted to annular outwardly pressed beads 3 around the centers of said disks 2, and have lugs 4 passing through openings 5 around in the beads and bent radially inward on the outer sides of the beads. The centers of the disks 2 are dished outward inside the beads 3 and have angular openings 6 which receive the angular shaft 7 so that the reel turns with the shaft 7.

The tubular core 1 is formed of an elongated sheet bent around into the cylindrical form, but the ends of this sheet do not quite meet, so that a slot 8 is left from end to end of the core 1 between the disks 2. Secured in this slot 8 is an eye 9, which has flanges 10 and 11 outside and inside the core 1, respectively, the eye thus being slidable along the slot from end to end of the core. The eye is for attaching the end of the line that is to be wound upon the reel and is very conveniently slid out toward the middle of the reel for tying the line to it, after which it may be slid over to one side or the other to begin the winding of the line evenly on the reel.

A bracket has sides 12, and may be secured to any convenient object such as a pole or the side of a building with its sides 12 extending substantially horizontally outward. Near the outer ends of these arms are circular openings 13 and the angular shaft 7 passes through these openings which thus form the journal bearings for the shaft, with the reel received between the sides 12.

Fixed on the angular shaft 7, to come outside the bearing in one of the arms 12, is a ratchet wheel 14 which has a circular boss 15 on the side next to the arm 12, this boss and this wheel and the shaft 7 all being fixed together, preferably by soldering. The boss 15 forms a lateral bearing against the outer side of the arm 12, holding the ratchet wheel 14 some distance away from this outer side. The shaft 7 extends some distance out past the ratchet wheel 14, and has a crank 16 screwed onto it or otherwise suitably fixed to it.

Down near the bottom of the arm 12, to the rear of and considerably below the bearing of the shaft 7 in the arm, a pawl 17 has a pivot 18. This pawl is so constructed that it not only co-acts with the ratchet wheel 14 to prevent unwinding rotation of the reel, but is made to engage the outer side of the ratchet wheel 14 to prevent withdrawal of the shaft 7 and consequent dismounting of the reel. Thus the pawl 17 comprises a flat elongated main or back part 19, being so mounted on the pivot 18 that the pivot is nearer one end than it is to the other of this main part, and this part 19 swings vertically edgewise between the ratchet wheel 14 and side 12 of the bracket. Adjacent to the end to which the pivot is nearer, there is a lug 20 extending laterally outward a short distance from the side of the main part away from the ratchet wheel, and then extending across the front of the main part; while up near the other end of the main part is another lug 21 like the lug 20 and extending laterally from the same side of and across the front of the main part. Thus constructed, the pawl may be swung on its pivot backward and downward to bring its shorter end up toward the ratchet wheel, whereupon the shorter laterally extending part of the lug 20 will engage with the teeth of the ratchet wheel, while the part that extends across will be adapted to engage with the outer side of the ratchet wheel, preventing the withdrawal of the shaft 7. This is the position of the pawl as shown by the solid lines in the drawing. If the pawl be swung over the other way, so that its longer end is over toward the ratchet wheel, the other lug 21 will bring its transverse part down, but this transverse part will be in such position that its edges cannot engage with the ratchet teeth but only its inner flat side will so engage. Thus the pawl in this position will not prevent the rotation of the reel in unwinding direction. However, the part of this lug 21 that extends across will come outside the ratchet wheel and prevent the withdrawal of the shaft from the reel the same as did the other lug. This position is shown by dotted lines in the drawing. For withdrawing the shaft from the reel to dismount the reel when it is intended to do so, the pawl 17 may be brought to a substantially vertical position, or about halfway between the above described positions. When the reel is thus dismounted it may be stored away with the line thereon, and if desirable, with the axle inserted therein; while the bracket or mounting having the sides 12 is left in position on the pole, building or other object.

By making the pawl 17 to perform the function not only of a pawl but of means to hold the shaft 7 against withdrawal, and making this pawl conveniently operative to either prevent or permit unwinding rotation of the reel, or to allow removal of the shaft to dismount the reel, the device is greatly simplified both in its construction and operation.

Having fully described my invention, what I claim as new and desire to secure by Letters Patent is:

1. In combination with a ratchet wheel, and a stationary mounting on which the ratchet wheel is held for rotation or for dismounting axially, a pawl for said ratchet wheel pivoted on said mounting, a lug on said pawl adjacent to one end thereof, and another lug near the other end of the pawl, said first described lug being adapted to engage with the teeth of the ratchet wheel when said pawl is swung backward and downward and thereby prevent rotation of said ratchet wheel in one direction, and said other lug being adapted to engage with the teeth of said ratchet wheel when the pawl is swung forward and upward but to permit rotation of said ratchet wheel in said direction, each of said lugs being positioned to extend outside of said ratchet wheel to engage the outer side thereof to prevent dismounting of the ratchet wheel, and dismounting of and withdrawal of the ratchet wheel being permitted by swinging said pawl midway between the aforesaid positions.

2. In combination with a ratchet wheel, and a stationary mounting on which the ratchet wheel is held for rotation or for dismounting axially, a pawl for said ratchet wheel, a pivot for said pawl located on said mounting some distance away from and below the center of said ratchet wheel and considerably nearer one end of said pawl than it is to the other end of said pawl, a lug on said pawl adjacent to the end to which the pivot is nearer, and comprising a part extending laterally from the side of said pawl away from said ratchet wheel and then extending across said pawl, and another lug similar to the above lug extending from said pawl on the same side as does the above lug, but near the other end of the pawl, said first described lug being adapted to engage with the teeth of the ratchet wheel when said pawl is swung backward and downward and thereby prevent rotation of said ratchet wheel in one direction, and said other lug being adapted to engage a flat side with the teeth of said ratchet wheel when the pawl is swung forward and upward, but to permit rotation of said ratchet wheel in said direction, each of said lugs being positioned to extend outside of said ratchet wheel to engage the outer side thereof to prevent dismounting of the ratchet wheel, and dismounting of the ratchet wheel being permitted by swinging said pawl midway between the aforesaid positions.

3. In combination with rotary means, and a stationary mounting therefor, a shaft turning in said mounting and turning with the rotary means, a bracket comprising parts flanking said rotary means and having openings through which said shaft extends at respective ends of the rotary means, said openings forming bearings for said shaft, a ratchet wheel fixed on said shaft and having an annular boss engaging with the outer side of one of said members of said bracket, spacing said ratchet wheel away from said member, manipulative means fixed on said shaft outside said ratchet wheel, and a pawl comprising a main part pivoted on said member of said bracket below and to the rear of said shaft with the pivot nearer one end of said pawl than it is to the other, said pawl swinging between said ratchet wheel and said member of said bracket, and a lug adjacent to the end of the pawl to which the pivot is nearer having a part the edge of which engages with the teeth of said ratchet wheel to prevent rotary means in one direction, and a part to extend outside the ratchet wheel and engage with the outer side thereof and prevent withdrawal of the shaft from the bracket and rotary means, and another lug on said pawl near its other end similar to the above described lug but adapted to engage its flat side with said ratchet teeth when the pawl is swung upward and forward to permit rotation of said rotary means in said direction, but having its part outside the ratchet wheel to engage with the outer side of the ratchet wheel and prevent withdrawal of the shaft from the bracket and rotary means, said pawl being swung to a position substantially midway of the aforesaid positions for withdrawal of said shaft from said bracket and rotary means to dismount said rotary means.

ALBERT O. CLAIN.

Witnesses:
JAMES N. RAMSEY,
CLARENCE PERDEU.